United States Patent Office 2,745,387
Patented May 15, 1956

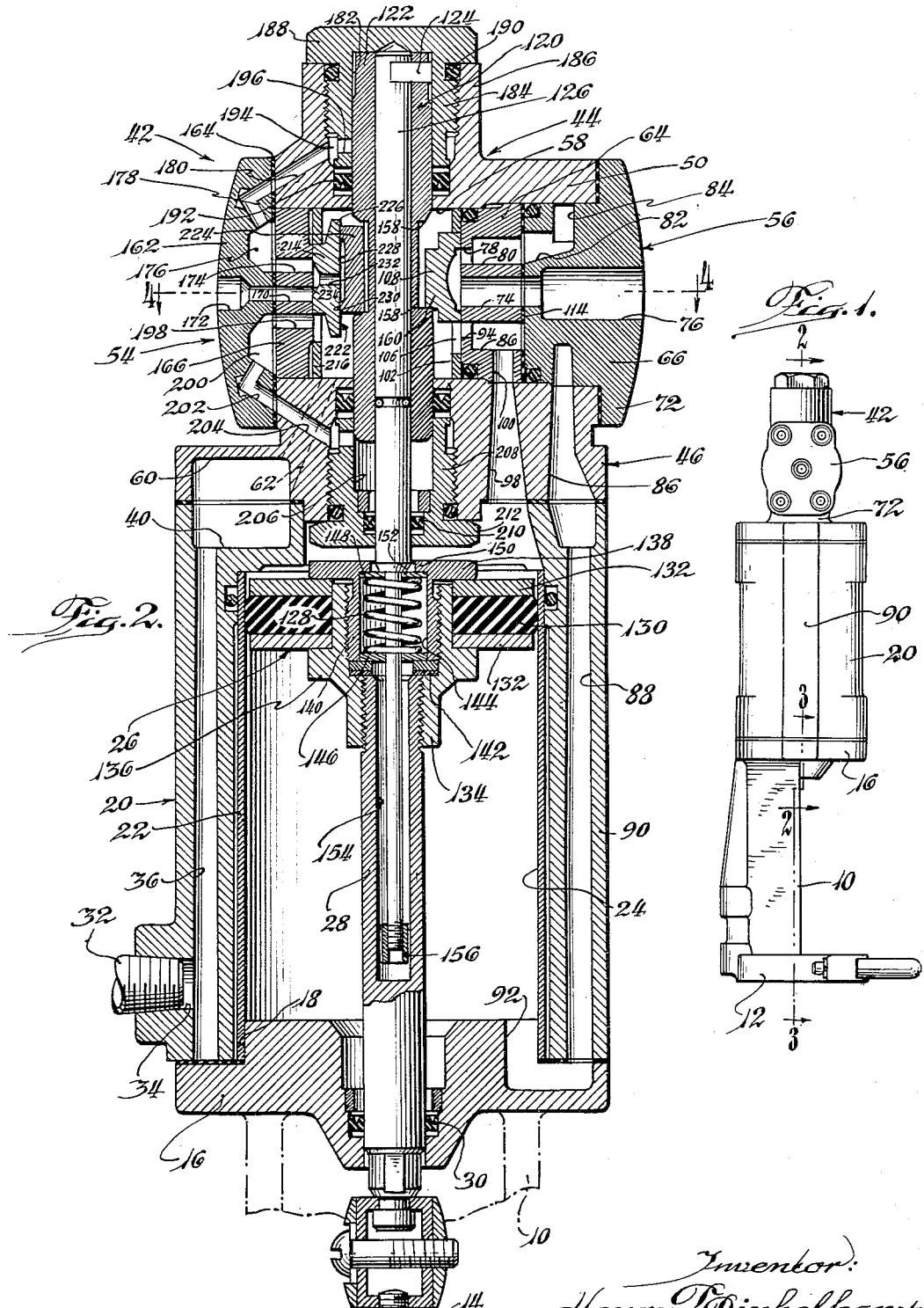

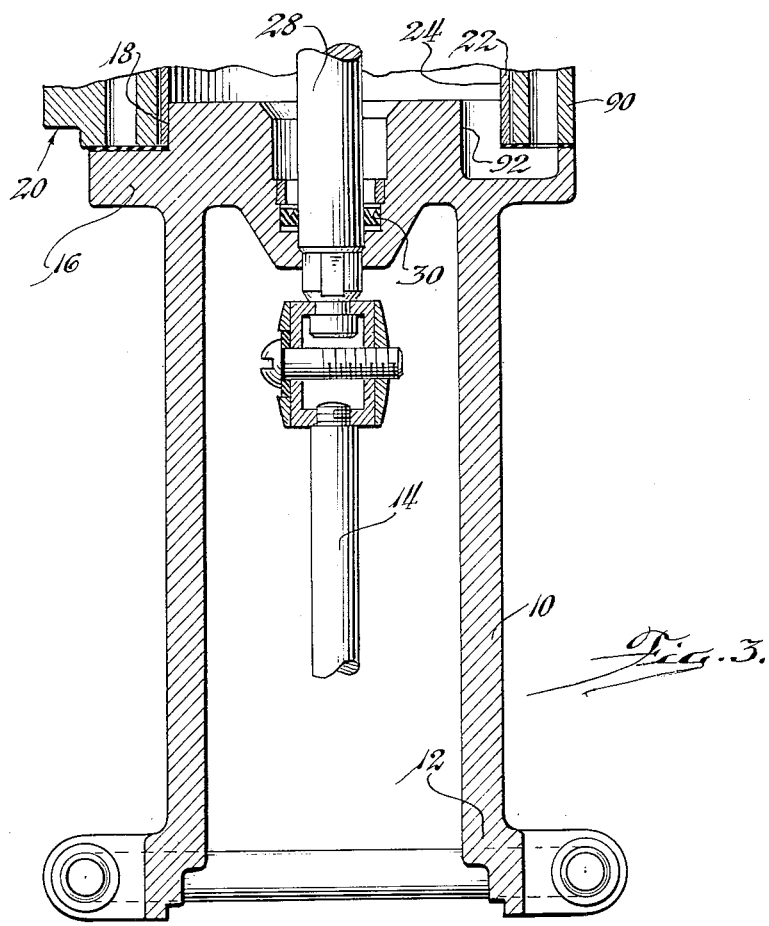
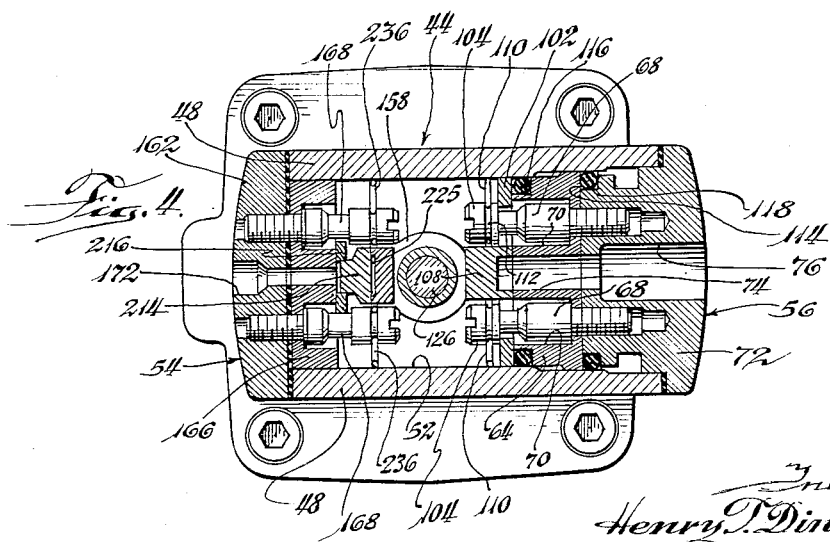

2,745,387

RECIPROCATING FLUID MOTOR AND VALVE MECHANISM THEREFOR

Henry T. Dinkelkamp, Niles, Ill., assignor to Stewart-Warner Corporation, Chicago, Ill., a corporation of Virginia Application September 25, 1953, Serial No. 382,241

9 Claims. (Cl. 121—154)

The present invention relates to reciprocating fluid motors for lubricant pumps and the like.

It will be understood that upon restriction or stoppage of the outflow of lubricant from a reciprocating pump driven by a reciprocating fluid motor, the driving piston of the motor may be greatly slowed in speed or brought to a halt. As this may occur at any position in the stroke of the motor piston, as an incident to closure of lubricating valves supplied with lubricant by the pump, it complicates the problem of reversing the motor piston at either end of its stroke while maintaining at all times its full effective force on the pump. An effective reversal of the motor piston at each end of its stroke even under such adverse conditions can be made by operating a main reversing valve for the motor piston by a fluid actuator energized by operating fluid diverted through a pilot valve.

One object of the invention is to provide a fluid motor of the above character, having improved fluid operated control means for reversing the motor piston at each end of its stroke.

A more specific object is to provide in a reciprocating fluid motor an improved slip connection between a pilot control valve and an actuator therefor which allows over travel of the latter. A related object is to provide an improved slip connection in this environment that has a highly satisfactory functional action that is not adversely affected by long usage even though this may be of sufficient duration to cause some wear on the coacting parts.

Other objects and advantages will be apparent from the following description of the form of the invention shown in the drawings, in which:

Figure 1 is an elevational view of a fluid motor incorporating the invention;

Fig. 2 is a vertical sectional view, on an enlarged scale, taken along line 2—2 of Fig. 1;

Fig. 3 is a vertical sectional view on an enlarged scale taken along line 3—3 of Fig. 1; and Fig. 4 is a horizontal sectional view taken along line 4—4 of Fig. 2.

The fluid motor forming the illustrated embodiment of the invention comprises, as shown in Figs. 1 to 3, an upright base 10, the lower end 12 of which is adapted to be clamped to a lubricant pump (not shown) and receive an operating rod 14 for the pump. The generally flat upper end 16 of the base 10 defines a peripheral recess 18 which receives the lower cylindrical edge of a hollow cylinder section 20. A vertical sleeve 22 fitted into the cylinder section 20 defines with structure on the upper end of the cylinder section 20 and the upper end 16 of the base 10, a power cylinder 24 which receives a main piston 26. A piston rod 28 extends downwardly from the piston 26 through a seal 30 in the upper base end 16 to connect with the pump operating rod 14.

Fluid under pressure for operating the motor is led through a conduit 32 into an inlet 34 in the lower end of the cylinder section 20 which connects with a vertical bore 36 in a thickened side wall portion 38 of the cylinder section 20 which leads to an upwardly open recess 40 in the upper end of the cylinder section. Fluid under pressure passes from the recess 40 into a valve casting 42 bolted to the upper end of the cylinder section 20 and closing the upper end of the power cylinder 24.

The casing 42 comprises a main casting 44 having a lower plate portion 46 conforming generally in size and shape to the upper end of the cylinder section 20. Upwardly of the plate portion 46, the casting 42 defines a large transverse bore 52 having side walls 48 and covered by a bridge section 50. The end of the bore 52 above the recess 40 in the cylinder section 20 is closed by a pilot valve subassembly 54; the opposite end of the bore is closed by a main valve subassembly 56 thus defining within the bore a chamber 58 for fluid under pressure. Operating fluid flows into the chamber 58 through a passageway 62 and a downwardly open recess 60 in the valve casing plate portion 46 aligned with the cylinder section recess 40.

From the chamber 58 operating fluid under pressure is directed to opposite ends of the power cylinder 24 by the main valve formed by the subassembly 56. As shown in Figs. 2 and 4, the main valve subassembly 56 comprises a port block 64 secured to the inner face of an outer block 66 by two double-headed bolts 68 disposed in laterally spaced, inwardly open counterbores 70 in the port block and threaded into the outer block 66. The port block 64 and the inner end of the outer block 66 extend into the adjacent end of the valve casing bore 52. A peripheral flange 72 formed on the outer end of the outer block 66 is bolted to the valve casing 42 (as shown in Fig. 1) to hold the main valve subassembly in place.

An outlet port 74 extends horizontally through the central portion of the port block 64 to an exhaust opening 76 in the outer block 66. A first control port 78 formed in the inner face of the port block 64 above the outlet port 74 communicates with the lower end of the power cylinder 24 through a bore 80 in the port block and a horizontal passageway 82 leading to a deep peripheral groove 84 in the portion of the outer block 66 disposed within the valve casing bore 52, a vertical passageway 86 formed in the valve casing plate portion 46, and a bore 88 extending downwardly through a thickened wall portion 90 of the cylinder section 20 to an elbow-like recess 92 in the lower piston head 16 opening into the lower end of the cylinder 24.

A second control port 94 formed in the port block 64 under the outlet port 74 communicates with the upper end of the power cylinder 24 through a horizontal bore 86 in the port block, a vertical passageway 98 in the valve casing plate portion 46, and a vertical bore 100 in the port block 64 connecting the passageway 98 with the horizontal bore 86.

A guide plate 102, held against the inner face of the port block 64 by the inner heads 104 of the bolts 68, defines a generally rectangular central opening 106 which receives a D slide valve 108 pressed against the inner face of the port block 64 by the pressure of operating fluid within the chamber 58. Shiftable between upper and lower operating positions, the slide valve 108 is recessed and dimensioned to connect either of the control ports 78 or 94 with the outlet port 74 while leaving the other control port uncovered for the free flow of operating fluid to the power cylinder 24.

As to further details, the slide 108 is steadied in the guide plate 102 by a pair of generally V-shaped springs 110 partially encircling peripheral grooves 112 in the respective bolt heads 104 and reacting on the adjacent valve casting side wall sections 48 to press against opposite sides of the slide. As shown, a suitably perforated gasket 114 is inserted between the outer block 66 and the port block 64. Suitable seals 116 and 118 are used to prevent the leakage of fluid around the peripheries of the port block and the outer block.

The slide 108 is shifted vertically between its two operating positions by a vertical actuator 120. In the present instance, the actuator 120 comprises a sleeve 122 fixed at its upper end by a crescent shaped key 124 to a stem 126 which extends down into the power cylinder 24 and has a lost motion connection with the main piston 26.

As shown in Fig. 2, the lost motion connection between the stem 126 and the piston 26 is made through one or more compression springs 128 contained within the central portion of the piston. As shown, the piston 26 itself comprises a rubberlike disc 130 clamped between two plates 132 encircling a hub 134 threaded to the upper end of the piston rod 28. The discs 130 and the plates 132 are held against a radial flange 136 on the hub 134 by a radial flange 138 on the upper end of a sleeve 140 threaded into the open upper end of the hub 134 to press against washers 142 in the hub. The helical spring 128 shown is contained within a central bore 144 in the sleeve 140 and acts against a lower disc 146 resting on the washers 142 and an upper disc 148 retained in the bore 144 by an inwardly projecting flange 150.

The lower end of the stem 126 is sharply necked down from a shoulder 152 on the stem and extends downwardly through the sleeve 140 and central openings in the discs 146, 148 into a deep axial bore 154 in the upper end of the piston rod 28. A short cylindrical head 156 somewhat larger in diameter than the central opening in the lower disc 146 is threaded on the lower end of the stem 126.

When the piston 26 approaches the upper end of its stroke, the upper disc 148 engages the shoulder 152 on the stem 126 compressing the spring 128 to exert an upward force on the actuator 120. Similarly, when the piston 26 approaches the lower end of its stroke, the lower disc 146 engages the head 156, again compressing the spring 128 to exert a downward force on the actuator 120.

A lost motion connection between the actuator 120 and the main valve slide 108 is formed by necking down a central segment of the actuator sleeve 122 to form two vertically spaced shoulders 158 disposed above and below an actuating lug 160 on the slide having a vertical height less than the vertical spacing between the shoulders.

Without disturbing the position of the main valve slide 108, initial shifting movement of the actuator 120 by the piston 26 operates a pilot valve in the subassembly 54 to supplement the force of the spring 128 on the actuator by the pressure of operating fluid supplied from the chamber 58.

As shown in Figs. 2 and 4, the pilot valve subassembly 54 comprises a rather thick cap 162 secured by bolts (not shown) to a flat peripheral surface 164 on the valve casing 42 surrounding the adjacent end of the bore 52. A port block 166 secured to the inner face of the cap 162 by double-headed bolts 168 defines an exhaust port 170 extending horizontally through the central portion of the block to connect with an exhaust opening 172 in the cap. A horizontal actuator control port 174 defined in the port block 166 just above the exhaust port 170 is connected by a recess 176 in the inner face of the cap 162, two intersecting bores 178 in the cap and a bore 180 in the valve casing 42 with an upper cylinder 182 which slidably receives the upper end of the actuator 120.

In the preferred construction shown, the cylinder 182 is formed by a bushing 184 threaded into a boss 186 on the valve casing 42 and having its upper end closed by an integral cap 188. An O-ring 190 forms a fluid tight seal between the bushing and the boss. An annular seal 192 encircles the actuator sleeve 122 at the inner end of the bushing 184. It will be noted further that the bore 180 leading from the pilot valve is connected to the cylinder 182 through an annular passage 194, formed between the bore 185 and the bushing 184 by reducing the outer diameter of an axial segment of the latter, and one or more radial bores 196 in the bushing. In the present construction the upper end of the actuator sleeve 122 is reduced to a diameter considerably less than the cylinder 182. Moreover, the actuator 120 has a rather loose fit in the cylinder 182 which permits fluid flow between the actuator and the surrounding wall of the cylinder.

The pilot valve subassembly 54 is generally symmetrical about a central horizontal plane. Thus, a second actuator control port 198 defined in the port block 166 communicates through a recess 200 and two intersecting bores 202 in the port block 166 and a bore 204 in the valve casing 42 with a second actuator cylinder 206 which slidably receives the lower end of the actuator sleeve 122. The structure forming the cylinder 206 is generally similar to that defining the upper actuator cylinder 182 and includes a bushing 208 threaded into the lower side of the valve casing 42. The actuator stem 126 extends downwardly through a seal 210 and a cap 212 at the lower end of the bushing. Thus, the upper end of the actuator sleeve 122 and the upper end of the stem 126 constitute one face of a piston the other face of which comprises the lower end of actuator 122.

The flow of fluid into and out of the two actuator cylinders 182 and 206 through the control bores 174 and 198 is controlled by a D slide member 214 guided for vertical shifting movement on the inner face of the port block 166 by a centrally open guide plate 216 held against the inner face of the port block 166 by the two double headed bolts 168. The slide 214 is recessed and dimensioned to connect either of the actuator control ports 174 or 198 with the exhaust bore 170, while at the same time permitting the free flow of operating fluid under pressure into the other control port.

Mounted at the side of the actuator 120 opposite from the main valve slide 108, the pilot valve slide 214 is shifted between upper and lower operating positions by the actuator, which is connected to the pilot valve slide by a slip connection 222 that allows for overtravel of the actuator to shift the main valve slide from one position to another as previously described.

Designed to operate with undiminished efficiency even after long usage, the slip connection 222 is extremely simple in construction. It consists basically of a friction block 224 moved by the actuator 120 and held against the pilot valve slide 214 by the operating fluid within the chamber 58 to have a frictional force on the slide greater than the movement retarding forces thereon. As shown in Figs. 2 and 4, the friction block 224 has a generally rectangular configuration and engages the inner vertical face 225 of the slide 214, which is enlarged by a peripheral flange 226 on the slide to have a vertical surface area considerably larger than the outer slide face which engages the port block 166.

A shallow recess 228 is formed in the outer vertical face of the friction block 224 leaving only a rather narrow marginal edge 230 to engage the opposed flat surface 225 on the slide 214. This recess 230 together with the opposed slide surface 225 defines a void which is vented through a horizontal bore 232 extending centrally through the slide valve 214, the recess 234 in the outer face of the slide, the exhaust bore 170, and the outlet opening 172.

The projected area of the friction block recess 228 on the inner vertical surface 225 of the slide 214 is larger than the face of the slide 214, which engages the port block 166, and is considerably greater than the projected area of the slide recess 234 on the inner vertical face of the port block. Thus the differential force of the fluid under pressure within the chamber 58 holding the friction block 224 against the slide 214 is proportionately greater than the differential fluid force producing frictional engagement of the slide against the inner face of the port block 166. Thus, for example, the friction between the block 224 and slide 214 may be about three times as great as the friction between the slide 214 and the port block 166.

It will be noted that two springs 236 similar to the previously described springs 110 partially encircle the inner heads of the bolts 168 to press against opposite sides of the friction block 224.

In reviewing the overall operation of the motor, it will be observed that the drawings illustrate the positional relationship of the component elements at the beginning of a downward stroke of the main piston 26. The main slide valve 108 is in its upper operating position connecting the lower end of the power cylinder 24 with the exhaust opening 76 and opening the control port 94 for the free flow of operating fluid into the upper end of the cylinder. The pilot valve slide 214 is also in its upper operating position connecting the upper actuator cylinder 182 with the outlet opening 172 and uncovering the port 198 to connect the fluid chamber 58 with the lower actuator cylinder 206. The actuator 120 is held in its upper position by fluid under pressure in the lower actuator cylinder 206.

When the main piston 26 approaches the lower end of its stroke, the lower disc 146 in the piston hub 134 engages the head 156 on the lower end of the actuator stem 126, compressing the spring 128 to exert a downward force on the actuator 120. As downward movement of the piston 26 continues, the force of the spring 128 overcomes the upward force of the fluid within the lower actuator cylinder 206 to impart an initial downward movement to the actuator. Due to the lost motion between the actuator 120 and the main valve slide 108, the position of the latter is not disturbed by initial downward movement of the actuator, which acts through the friction block 224 to shift the pilot valve slide 214 downwardly.

Since the frictional force of the friction block 224 on the pilot valve slide 214 exceeds the retarding forces on the slide, the slide is moved along with the friction block until it is stopped in its lower operating position by engagement with the lower cross member of the guide plate 216. In this position the pilot valve slide connects the lower actuating cylinder 206 with the outlet opening 172 and uncovers the bore 174 for the flow of fluid under pressure into the upper actuator cylinder 182. The pressure of fluid entering this upper cylinder acts cumulatively with the force of the spring 128 to carry through the downward shifting movement of the actuator 120 to shift the main valve slide 108 to its lowermost position even through the main piston 26 may have been slowed in speed or brought to a halt by the resistance of the pump being actuated. In this manner the operating fluid controlled by the pilot valve effectively prevents the motor from becoming stalled at either end of its stroke.

During over-travel of the actuator 120, which shifts the main valve slide 108 to its lower operating position after the pilot valve slide 214 has been shifted to its lower operating position, the friction block 224 of the slip connection 222 slides downwardly along the vertical slide surface 225. It will be appreciated that any wear on the contacting surfaces of the friction block 224, the pilot valve slide 214 and the pilot valve port block 166, which may result from long usage of the motor, does not interfere with the operation of the pilot valve or diminish the efficiency of its slip connection to the actuator 120. Since the pilot valve slide 214 is held against the port block 166 by fluid pressure within the chamber 58 which also holds the friction block 224 against the slide, any wear on the coacting surfaces of these parts does not vary their relative frictional forces.

It will be appreciated that when the main piston 26 approaches the upper end of its stroke, the upper disc 148 in the piston hub 134 engages the shoulder 152 on the actuator stem 126, compressing the spring 128 and imparting an upward force to the actuator 120, resulting in a valve shifting action similar to that just described which continues the cyclic operation of the motor.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A fluid motor comprising, in combination, a cylinder, a main piston slidable within said cylinder, a main valve including a flow control member for directing fluid under pressure to opposite ends of said cylinder, an actuator having a lost motion connection with said flow control member, means forming a lost motion connection between said actuator and said main piston, means defining two actuator cylinders receiving opposite ends of said actuator, pilot valve means including a flow control member movable between two operating positions for directing fluid under pressure to either of said actuator cylinders while exhausting the other cylinder, motion limiting means positioned to prevent shifting movement of said pilot valve flow control member beyond either of said operating positions therefor, and means forming a slip connection between said pilot valve flow control member and said actuator whereby initial movement of said actuator by said main piston transmitted through said slip connection to said pilot valve means serves to direct fluid under pressure into the appropriate one of said actuator cylinders to continue the movement of said actuator to shift said main valve flow control member to reverse said main piston.

2. In a reciprocating fluid motor having a main piston, the combination of a pilot control valve including a flow control member shiftable between two operating positions, means for precluding shifting movement of said flow control member beyond either operating position, an actuator for said flow control member adapted to be interconnected with the main piston of the motor, means forming a slip connection between said actuator and said flow control member and including a friction block movable by said actuator and slidably engageable with means on said flow control member, said friction block and said last mentioned means being disposed within means adapted to contain fluid under pressure, recess means defining a void between said friction block and said flow control member means, and means venting said void so that a substantial frictional force between said friction block and the coacting flow control member means is induced by the differential force due to fluid pressure on said block.

3. A fluid motor comprising, in combination, a cylinder, a power piston slidably mounted in said cylinder, an elongated valve actuator having a lost motion connection with said piston, a main valve for controlling the flow of fluid into opposite ends of said cylinder and including a flow control member mounted at one side of said actuator and having a lost motion connection therewith, piston means on said actuator, cylinder means receiving said actuator piston means, pilot valve means for directing fluid into said actuator cylinder means to shift said actuator in opposite directions, said pilot valve means including a flow control member mounted on the side of said actuator opposite from said main valve flow control member, motion limiting means coacting with said pilot valve flow control member to limit reverse shifting movements thereof to an extent considerably less than the overall movement of said actuator, and means forming a slip connection between said pilot valve flow control member and said actuator.

4. In a fluid motor, valve actuating means comprising, in combination, actuator cylinder means, actuator piston means in said cylinder means, means forming a chamber for operating fluid under pressure and passageways leading therefrom to said actuator cylinder means, a port member constituting a portion of said chamber forming means and defining control ports therein communicating with said passageways and with a fluid outlet, a flow control slide within said chamber having one face in slidable engagement with said port member and defining a recess in said face for connecting said passageways with said outlet, the side of said slide opposite from said face defining a slide surface substantially larger than said slide face, actuating means for said slide including a friction member having slidable contact with said slide surface thereon, said friction member defining a recess therein surrounded by a marginal edge having slidable engagement with said slide surface, the projected area of said friction member recess on said slide surface being larger than the projected area of said slide recess on said slide face, and passageway means in said slide establishing communication between said friction member recess and said slide recess, whereby the differential fluid force pressing said friction member against said slide is considerably greater than the fluid force pressing said slide against said port member.

5. In a fluid motor, the combination of a pilot control valve including a flow control member, an actuator for shifting said flow control member between two operating positions thereof, means for forming a slip connection between said actuator and said flow control member and including a friction member, said friction member having slidable engagement with a coacting element of said slip connection, means defining a void between said friction member and said coacting slip connection element, means for containing said friction member and said coacting slip connection element in fluid under pressure, means venting said void to a pressure lower than the fluid pressure within said containing means whereby a differential fluid force on said friction member produces a frictional engagement of the latter on said coacting slip connection element sufficient to shift said flow control member upon movement of said actuator, and means for terminating shifting movement of said flow control member at either of said operating positions.

6. In a pilot valve mechanism of the character described, the combination of a shiftable flow control member, an actuator for said member, a friction member movable with said actuator and having slidable contact with said flow control member, said friction member and said flow control member being formed to define a space therebetween, said flow control member and said friction member being disposed within means adapted to contain fluid under pressure, and means venting said space to a pressure lower than that within said fluid containing means whereby the differential force of fluid therein on said friction member produces a frictional engagement of the latter on said flow control member.

7. A fluid motor comprising, in combination, a main cylinder, a power piston slidable within said cylinder, a valve actuator having a lost motion connection with said piston, spring means for cushioning the connection between said piston and said actuator, means defining a chamber for operating fluid under pressure, a main valve having a lost motion connection with said actuator for directing operating fluid from said chamber to opposite ends of said cylinder, piston means on said actuator, cylinder means receiving said actuator piston means, pilot valve means for directing operating fluid into and out of said actuator cylinder means to produce shifting forces in opposite directions on said actuator piston means, said pilot valve means including a flow control slide having a recess in one side thereof for connecting said cylinder means with a fluid outlet, a friction block movable by said actuator and disposed within said chamber to have slidable engagement with the side of said pilot valve slide opposite from said recess therein, recess means defining an enclosed void between said friction block and said pilot valve slide, means defining a passageway in said pilot valve flow control slide venting said void through said slide recess, said recess means defining said void having a projected area on the plane of slidable contact between said friction block and said slide larger than the projected area of said slide recess on the plane of contact between said slide and coacting flow control structure, whereby fluid under pressure within said chamber exerts a differential force on said friction block considerably greater than the fluid force on said slide, and means for terminating shifting movement of said pilot valve slide at either operating position thereof.

8. In valve actuating means for a fluid motor, the combination of a pilot control valve including a flow control member, an actuator for said flow control member, a first friction element movable with said flow control member, a second friction element movable by said actuator, means for containing said first and second friction elements in fluid under pressure, said first and second friction elements defining an enclosed void therebetween, and means venting said void whereby said first and second friction elements are held in frictional engagement with each other by differential fluid forces thereon.

9. In a reciprocating fluid motor having a main cylinder and a power piston slidable in the cylinder, the combination of a main control valve for the motor, fluid actuating means for reversing the main control valve, a pilot valve connected to control said main valve actuating means and including a fluid flow control member, an actuator for said pilot valve flow control member adapted to be operated by the main piston of the motor, means forming a frictional slip connection between the pilot valve flow control member and said actuator therefor, and motion limiting means mounted for coaction with said pilot valve flow control member to limit reverse shifting movements thereof to an extent considerably less than the overall movement of said actuator therefor.

References Cited in the file of this patent
UNITED STATES PATENTS

| Re. 2,359 | Hubbard et al. | Sept. 18, 1866 |
| 32,917 | Stevens | July 23, 1861 |
| 263,785 | Hubbard | Sept. 5, 1882 |
| 424,686 | Patten | Apr. 1, 1890 |
| 511,836 | Dahlstrom | Jan. 2, 1894 |
| 999,642 | Gage | Aug. 1, 1911 |
| 2,470,086 | Adams | May 17, 1949 |